United States Patent [19]
Ito et al.

[11] Patent Number: 4,872,116
[45] Date of Patent: Oct. 3, 1989

[54] VEHICLE MOTION ESTIMATING SYSTEM OF HYBRID TYPE

[75] Inventors: Ken Ito, Yokohama; Taketoshi Kawabe, Tokyo, both of Japan

[73] Assignee: Nissan Motor Company, Limited, Yokohama, Japan

[21] Appl. No.: 325,119

[22] Filed: Mar. 20, 1989

Related U.S. Application Data

[63] Continuation of Ser. No. 948,155, Dec. 31, 1986, abandoned.

[30] Foreign Application Priority Data

Jan. 10, 1986 [JP]   Japan ................................... 61-1978

[51] Int. Cl.[4] ............................................. G06F 15/20
[52] U.S. Cl. ............................... 364/424.05; 364/605; 180/142
[58] Field of Search ....................... 364/424.01, 424.05, 364/602, 605, 578; 180/79.1, 141, 142

[56] References Cited

U.S. PATENT DOCUMENTS

| | | | |
|---|---|---|---|
| 3,522,419 | 8/1970 | Miura et al. | 364/605 |
| 3,866,706 | 2/1975 | Lincke et al. | 180/79.2 R |
| 3,875,378 | 4/1975 | Maio et al. | 364/605 |
| 3,897,846 | 5/1975 | Inoue | 180/79.2 R |
| 4,593,358 | 6/1986 | Takeshima et al. | 364/424 |
| 4,679,809 | 7/1987 | Ito et al. | 364/424 |
| 4,690,431 | 9/1987 | Ito et al. | 180/142 |
| 4,706,771 | 11/1987 | Kawabe et al. | 364/424 |

Primary Examiner—Gary Chin
Attorney, Agent, or Firm—Foley & Lardner, Schwartz, Jeffery, Schwaab, Mack, Blumenthal & Evans

[57] ABSTRACT

A vehicle motion estimating system for estimating a vehicle motion variable such as yaw rate, lateral acceleration, or side slip angle by using a mathematical vehicle model is composed of a digital device such as a microcomputer for digitally solving equations of vehicle motion of a time-varying type such as equations of yawing motion and side slipping motion, and an analog device for solving one or more time-invariant linear differential equation such as an equation of a steering system about a kingpin or an equation of rolling motion.

10 Claims, 3 Drawing Sheets

VEHICLE MOTION ESTIMATING SYSTEM OF HYBRID TYPE

This application is a continuation of application Ser. No. 948,155, filed Dec. 31, 1986 now abandoned.

CROSS REFERENCES TO RELATED APPLICATIONS

The following copending, commonly assigned, U.S. patent applications relate subject matter similar to that of the present invention.
(1) Ser. No. 755,352 now Pat. No. 4,773,012;
(2) Ser. No. 773,621 now Pat. No. 4,690,431;
(3) Ser. No. 773,622 now abandoned;
(4) Ser. No. 773,650 now Pat. No. 4,679,809;
(5) Ser. No. 823,324 now Pat. No. 4,706,771;
(6) Ser. No. 837,170 now Pat. No. 4,679,808;
(7) Ser. No. 850,665 now Pat. No. 4,767,588;
(8) Ser. No. 883,719 now Pat. No. 4,706,979; and
(9) Ser. No. Unknown, based on a prior Japanese patent application 60-276590.

BACKGROUND OF THE INVENTION

1. Field of the Invention

The present invention relates to vehicle motion estimating systems for estimating one or more vehicle motion variables by using a predetermined vehicle model.

2. Description of Prior Art

Recent advances in automotive electronics have been increasing the demand for various sensors for sensing a wide variety of vehicle motion variables. However, only a few of the motion variables are easy to sense, and only a few sensors such as a yaw rate sensor and a lateral acceleration sensor are known. Moreover, it would be undesirable and difficult to mount as many sensors as the required vehicle motion variables are of many kinds.

3. Description of Other Information

The above-mentioned U.S. patent application Ser. No. 837,170 proposes a vehicle motion estimating system which is designed to determine one or more vehicle motion variables by solving a mathematical vehicle model consisting of equations of vehicle motion. This system can determine various vehicle motion variables without using any sensor for sensing such motion variables. With this estimating system, it is not necessary to provide a sensor for each vehicle motion variable, and it is possible to determine the vehicle motion variables which are difficult or impossible to sense.

In order to improve the accuracy of calculation in determining various vehicle motion variables by using such a mathematical model; (1) The accuracy in mathematical modeling must be sufficiently high. That is, the model must be one having many degrees of freedom. (2) Especially when integration is performed digitally, it is desirable to make an interval of integration short, and to reduce an error of integration.

However, microcomputers for on-board automotive applications do not have a sufficient computing ability to fulfill the above-mentioned requirements. If a usual on-board automotive microcomputer is arranged to satisfy the above-mentioned requirements, then the operation time will become too long to perform a real-time vehicle motion estimation.

On the other hand, analog computers are advantageous in computing speed. However, it is difficult to ensure satisfactory dynamic range and noise margins in an analog computer.

SUMMARY OF THE INVENTION

It is an object of the present invention to provide a vehicle motion estimating system which is capable of determining one or more vehicle motion variables without sensors for sensing them, and which is accurate, speedy, and suitable for on-board applications.

According to the present invention, a vehicle motion estimating system for estimating at least one vehicle motion variable such as yaw rate, lateral acceleration, side slip angle, cornering forces, or roll angle, by solving a mathematical model representing a simulated vehicle by means of a set of equations of vehicle motion comprises a digital device and an analog device. The digital device, such as a microcomputer, solves at least one of the equations of vehicle motion which is a nonlinear equation or a time-varying differential equation. The analog device solves at least one of the equations which is not solved by the digital device.

In a preferred embodiment of the present invention, an equation of a steering system about a kingpin is solved by the analog device while equations of yawing motion and side slipping motion are solved digitally by the digital device.

DETAILED DESCRIPTION OF THE INVENTION

Figure 1:
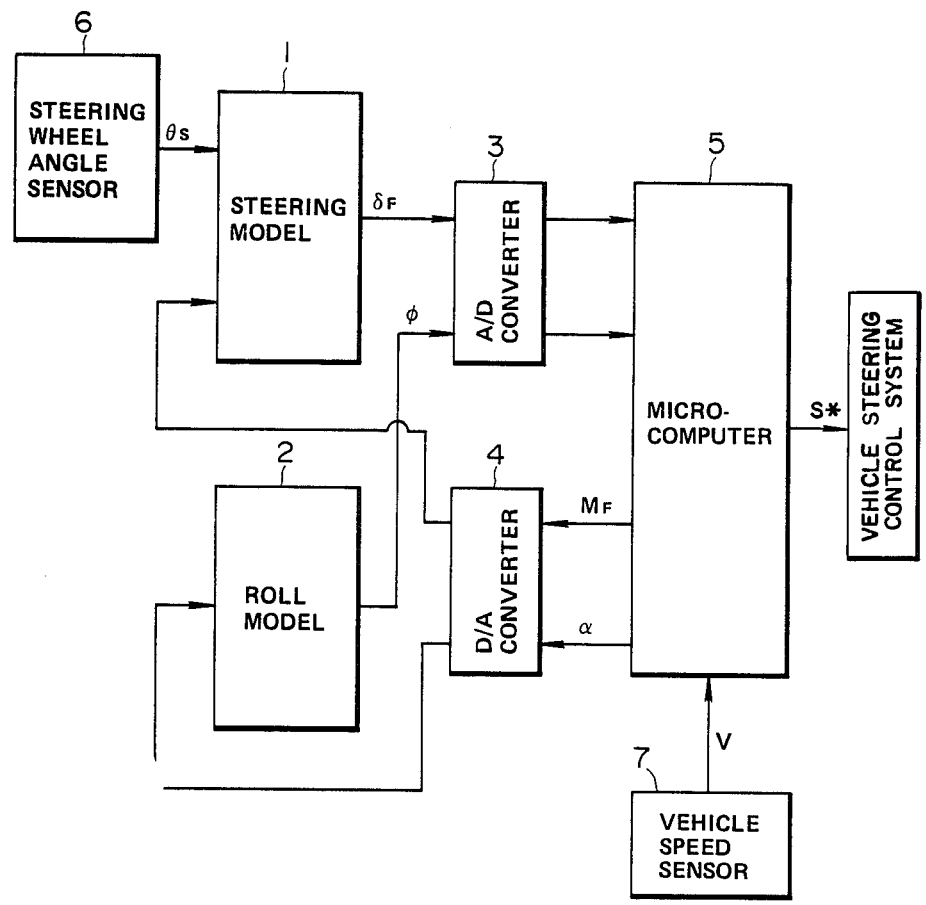
FIG. 1 is a block diagram showing one embodiment of the present invention.

One embodiment of the present invention is shown in FIG. 1.

A vehicle motion estimating system shown in FIG. 1 has a steering wheel angle sensor 6 for sensing a steering wheel angle $\theta_s$ and a vehicle speed sensor 7 for sensing a vehicle speed V, and is designed to estimate one or more vehicle motion variables such as a yaw rate and a side slip angle, from the steering wheel angle $\theta_s$ and the vehicle speed V by using a vehicle model.

The above-mentioned vehicle model is a mathematical model representing a simulated vehicle by means of a set of equations of vehicle motion which describe the interaction of variables defined to represent inputs, outputs and internal states of the simulated vehicle, and which are specified by values of vehicle parameters which are generally constants specifying the simulated vehicle. The vehicle model of this embodiment consists of a steering model, a roll model, and a two-degree-of-freedom planar motion model of yaw and side slipping motion. Therefore, the vehicle model has four degrees of freedom, as a whole. The estimating system of FIG. 1 has a first analog computing circuit 1 for solving the steering model, a second analog computing circuit 2 for solving the roll model, and a digital microcomputer 5 for solving the planar motion model and performing other functions.

The first analog computing circuit 1 receives the steering wheel angle $\theta_S$ directly from the steering wheel angle sensor 6, and further receives a self aligning torque $M_F$ which is estimated by the microcomputer 5 and changed into the form of an analog signal by a digital-to-analog converter 4. Then, the first analog circuit 1 estimates a front wheel steer angle $\delta_F$ (delta F) by using the steering model. The front wheel steer angle $\delta_F$ estimated by the first analog circuit 1 is converted from analog form to digital form by an analog-to-digital converter 3, and then inputted into the microcomputer 5.

The second analog computing circuit 2 receives a lateral acceleration $\alpha$ which is estimated by the microcomputer 5 and is converted from digital form to analog form by the D/A converter 4. The second analog circuit 2 estimates a vehicle roll angle $\phi$ (phi) by using the roll model. The roll angle $\phi$ estimated by the second analog circuit 2 is converted from analog form to digital form by the A/D converter 3, and then inputted into the microcomputer 5.

The microcomputer 5 receives the front wheel steer angle $\delta_F$ estimated by the first analog circuit 1 and the roll angle $\phi$ estimated by the second analog circuit 2 through the A/D converter 3, and further receives the vehicle speed V from the vehicle speed sensor 7. From these inputs, the microcomputer 5 estimates not only the self aligning torque $M_F$ and the lateral acceleration $\alpha$, but also one or more arbitrarily selected other vehicle motion variables such as the yaw rate and side slip angle by using the two-degree-of-freedom planar motion model, and outputs an estimated value S* of at least one vehicle motion variable to a vehicle steering control system for controlling the vehicle.

The four-degree-of-freedom vehicle model of this embodiment is a set of four equations of vehicle motion expressed as follows:

$$I_K \ddot{\delta}_F = K_S(\theta_S/N - \delta_F) - D_K \dot{\delta}_F - M_F \quad (1)$$

(where $M_F = 2(\xi_N + \xi_C)C_F$.)

$$I_Z \dot{\psi} = 2L_F C_F - 2L_R C_R \quad (2)$$
$$M(\dot{V}_y + V \cdot \psi) = 2C_F + 2C_R \quad (3)$$

(where
$C_F = K_F \beta_F, \ C_R = K_R \beta_R,$
$\beta_F = \delta_F + R_{SF} \cdot \phi - (V_y + L_F \psi)/V,$
$\beta_R = R_{SR} \cdot \phi - (V_y - L_R \psi)/V.$)

$$I_X \ddot{\phi} = -C_\phi \dot{\phi} - K_\phi \cdot \phi + (H_g - H_\phi)M\alpha \quad (4)$$

(where $\alpha = \dot{V}_y + V \cdot \psi$.)

In the equations (1)-(4);
M: a vehicle mass,
$I_Z$: a yawing moment of inertia,
$L_F$: a distance between a front axle and a vehicle center of gravity,
$L_R$: a distance between a rear axle and the vehicle center of gravity,
$K_F$: a front wheel cornering power,
$K_R$: a rear wheel cornering power,
N: a steering gear ratio (overall steering ratio),
$I_K$: a moment of inertia about a kingpin,
$D_K$: a viscosity coefficient about a kingpin,
$K_S$: a steering stiffness as viewed from the tire's side,
$\xi_N$: a pneumatic trail,
$\xi_C$: a caster trail,
$I_X$: a rolling moment of inertia,
$C_\phi$: a viscosity coefficient of rolling motion,
$K_\phi$: a roll stiffness,
$R_{SF}$: a front roll steer coefficient (rad/rad),
$R_{SR}$: a rear roll steer coefficient (rad/rad),
$H_g$: a height of the center of gravity,
$H_\phi$: a roll center height,
$\psi$: a yaw rate,
$\dot{\psi}$: a yaw acceleration,
$V_y$: a side velocity,
$\dot{V}_y$: a side acceleration,
$\beta$: a side slip angle of the center of gravity,
$C_F$: a front wheel cornering force,
$C_R$: a rear wheel cornering force,
$\beta_F$: a front wheel tire side slip angle,
$\beta_R$: a rear wheel tire side slip angle.

The equation (1) is an equation of motion about a kingpin, and a constituent of the steering model. The equation (4) is an equation of rolling motion, and a constituent of the roll model. The equation (2) is an equation of yawing motion, and the equation (3) is an equation of side slipping motion. The equations (2) and (3) are constituents of the two-degree-of-freedom planar motion model.

The following state equation can be obtained from the equation (1) by regarding the steering wheel angle $\theta_S$ and the self aligning torque $M_F$ inputted from the tire, as system inputs;

$$\underbrace{\frac{d}{dt}\begin{bmatrix}\delta_F \\ \dot{\delta}_F\end{bmatrix}}_{X} = \underbrace{\begin{bmatrix}0 & 1 \\ -\frac{K_S}{I_K} & -\frac{D_K}{I_K}\end{bmatrix}}_{A_1}\underbrace{\begin{bmatrix}\delta_F \\ \dot{\delta}_F\end{bmatrix}}_{X_1} + \underbrace{\begin{bmatrix}0 & 0 \\ \frac{K_S}{I_K N} & -\frac{1}{I_K}\end{bmatrix}}_{B_1}\underbrace{\begin{bmatrix}\theta_S \\ M_F\end{bmatrix}}_{u_1} \quad (5)$$

In the state equation (5), all the elements of matrices $A_1$ and $B_1$ are fixedly determined by the vehicle parameters, and therefore the matrices $A_1$ and $B_1$ are constant and do not vary with time. That is, the equation (1) is a time-invariant linear equation. Therefore, the equation (1) can be solved by an analog device.

Figure 2:
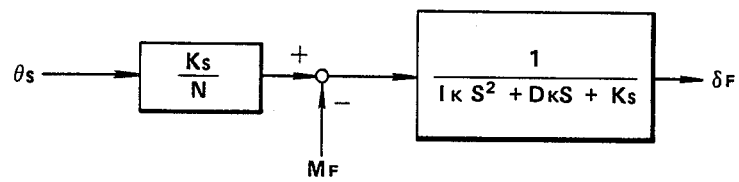
FIG. 2 is a block diagram showing a steering model shown in FIG. 1.
Figure 3:
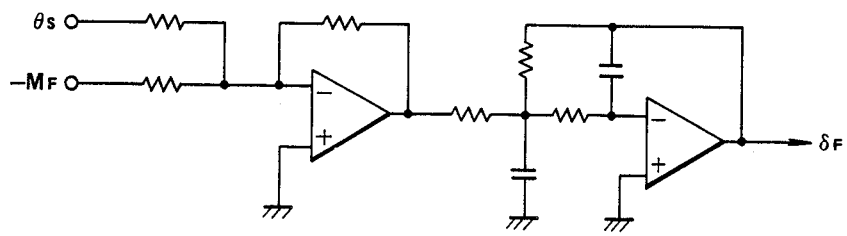
FIG. 3 is a circuit diagram showing one example of the steering model.

FIG. 2 shows the first analog computing circuit 1 for steering model in the form of a block diagram. FIG. 3 shows one example of the first analog circuit 1. As shown in FIG. 2, the first analog circuit 1 has a first section whose transfer function is $K_S/N$ and a second section whose transfer function is $1/(I_K S^2 + D_K S + K_S)$. The steering wheel angle $\theta_S$ is inputted to the first section, and a difference of the output of the first section from the self aligning torque $M_F$ is inputted to the second section. The second section delivers the front wheel steer angle $\delta_F$.

The following state equation (6) can be obtained from the equation (4) by regarding the lateral acceleration $\alpha$ acting on the center of gravity as an input in the rolling motion;

$$\frac{d}{dt}\begin{bmatrix}\phi\\ \dot\phi\end{bmatrix}_{X_2} = \underbrace{\begin{bmatrix}0 & 1\\ -K_\phi I_X & -\dfrac{C_\phi}{I_X}\end{bmatrix}}_{A_2}\begin{bmatrix}\phi\\ \dot\phi\end{bmatrix}_{X_2} + \qquad (6)$$

$$\underbrace{\begin{bmatrix}0\\ (H_g + H_\phi)M\end{bmatrix}}_{B_2}\alpha_{u_2}$$

In the state equation (6), all the elements of matrices $A_2$ and $B_2$ are fixedly determined by the vehicle parameters, as in the state equation (5). Therefore, the rolling model is also time-invariant and linear, and the equation (4) is suitable for an analog device.

Figure 4:
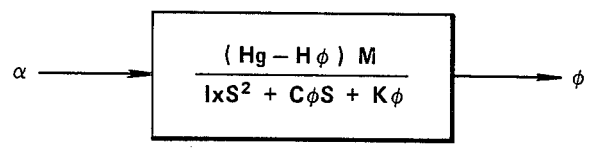
FIG. 4 is a block diagram showing a roll model of FIG. 1.
Figure 5:
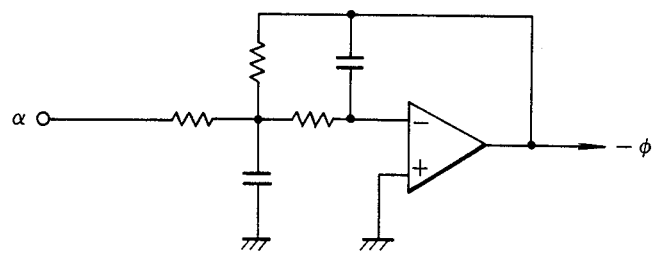
FIG. 5 is a circuit diagram showing one example of the roll model.

The second analog circuit 2 for the rolling model is shown in FIG. 4 in the form of a block diagram. FIG. 5 shows one example of the second analog circuit 2. As shown in FIG. 4, the second analog circuit 2 has a transfer function expressed as;

$$(H_g - H_\phi)M/(I_X S^2 + C_\phi S + K_\phi).$$

The following state equation can be obtained from the equations (2) and (3) by regarding the front wheel steering angle, a front wheel roll steer $R_{SF}\phi$, and a rear wheel roll steer $R_{SR}\phi$, as system inputs:

$$\frac{d}{dt}\begin{bmatrix}\psi\\ V_y\end{bmatrix}_{X_3} = \underbrace{\begin{bmatrix}\dfrac{-2(L_F^2 K_F + L_R^2 K_R)}{I_Z}\cdot\dfrac{1}{V} & \dfrac{-2(L_F K_F - L_R K_R)}{I_Z}\cdot\dfrac{1}{V}\\ \dfrac{-2(L_F K_F - L_R K_R)}{M}\cdot\dfrac{1}{V}-V & \dfrac{-2(K_F + K_R)}{M}\cdot\dfrac{1}{V}\end{bmatrix}}_{A_3}\begin{bmatrix}\psi\\ V_y\end{bmatrix}_{X_3}+ \qquad (7)$$

$$\underbrace{\begin{bmatrix}\dfrac{2L_F K_F}{I_Z} & \dfrac{2L_F K_F}{I_Z} & \dfrac{-2L_R K_R}{I_Z}\\ \dfrac{2K_F}{M} & \dfrac{2K_F}{M} & \dfrac{2K_R}{M}\end{bmatrix}}_{B_3}\begin{bmatrix}\delta_F\\ R_{SF}\cdot\phi\\ R_{SR}\cdot\phi\end{bmatrix}_{u_3}$$

In the state equation (7), each element of a matrix $A_3$ includes the vehicle speed V which is a variable quantity varying with time. That is, the two-degree-of-freedom approximate model for simulating a planar motion having one rotational degree of freedom in yawing motion and one translational degree of freedom in side slipping motion is a time-varying system. Therefore, it is difficult to treat the equations (2) and (3) by an analog device.

In a time-varying system, parameters (which are the elements of the matrix $A_3$ in the present case) tend to vary very widely. Therefore, it is difficult to solve an equation of a time-varying system accurately and precisely with a device, such as an analog device, having a limited dynamic range.

In a digital computer, a sufficient dynamic range can be ensured by increasing the word length. Therefore, a digital computer can solve an equation of a time-varying system accurately and precisely.

In this embodiment of the present invention, the equations of yawing motion and side slipping motion which are time-varying differential equations, are solved digitally by the microcomputer 5, and the equation of motion about kingpin and the equation of reolling motion which are time-invariant linear equations, are solved by the analog computing elements. Therefore, this embodiment of the present invention can increase the computing speed by alleviating the burden imposed on the microcomputer 5, and at the same time maintain the accuracy and precision by using the microcomputer 5 for the equations not suitable to the analog computing elements. The vehicle motion estimating system of the embodiment is high in solution speed, and superior in accuracy.

Especially, the motion of the steering system has a high natural frequency of about 30 Hz whereas the natural frequencies of planar motion (yawing motion and side slipping motion) and rolling motion are 1-2 Hz. Therefore, a digital computation of the steering model would have to be ten or more times as fast as the computation of the planar motion in order to maintain the precision identical to that of an analog computation. In contrast to this, the analog elements are not affected by the magnitude of the natural frequency because of the continuous nature of the analog elements.

Figure 6:
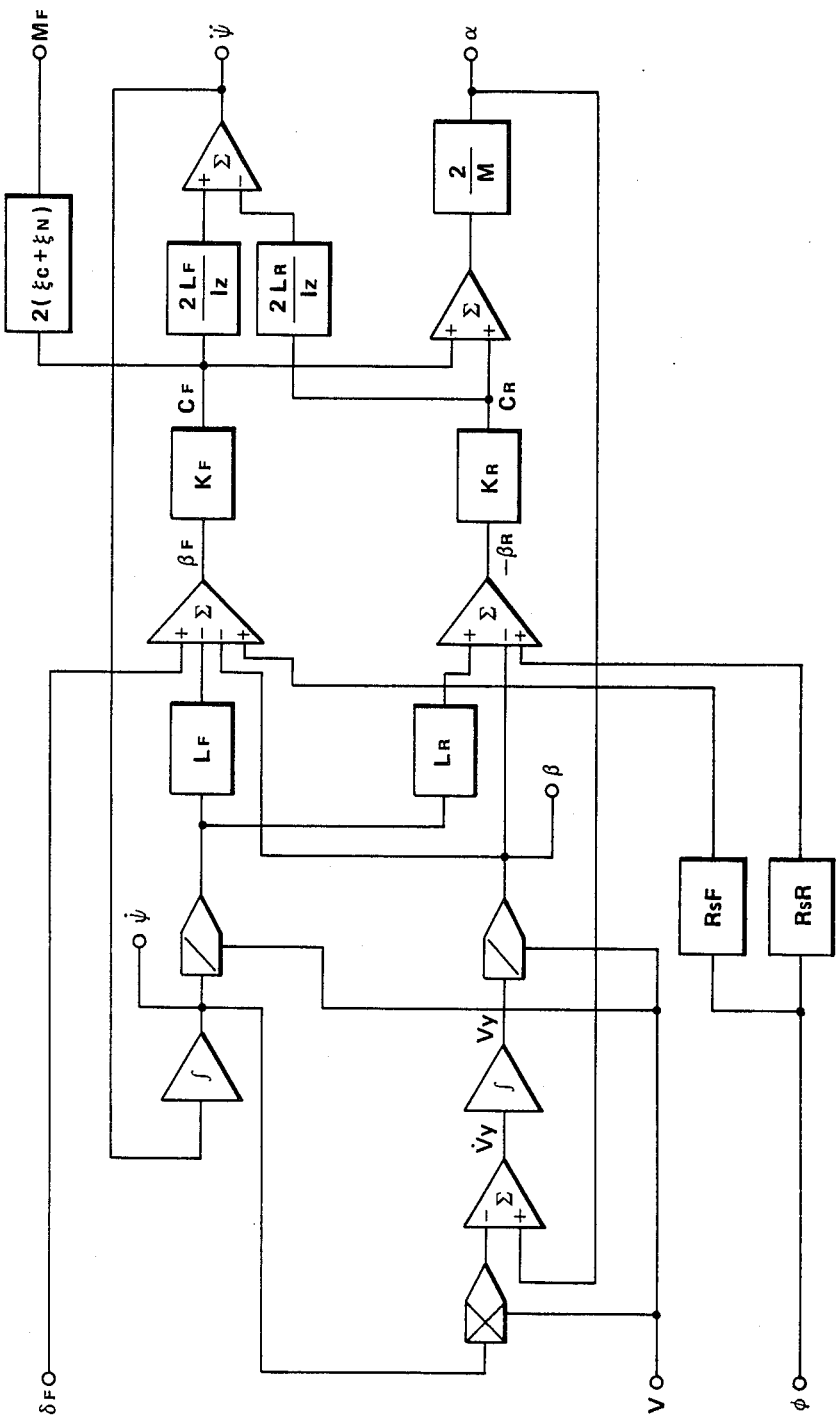
FIG. 6 is a block diagram showing an IC type circuit usable in place of a microcomputer of FIG. 1.

An IC type digital processing circuitry using digital elements such as TTLIC may be used as the microcomputer 5 of FIG. 1. In this case, the circuitry may be arranged as shown in a block diagram of FIG. 6.

In the illustrated embodiment, the roll model is solved by the analog circuit 2. However, the system of the present invention may be arranged to solve the roll model digitally. Furthermore, the present invention is applicable to not only four-degree-of-freedom vehicle models such as the vehcile model of the illustrated embodiment, but also vehicle models having five or more degrees of freedom, or two or three degrees of freedom.

The motion estimating system of the present invention may be arranged further to include a parameter adjusting means for performing a parameter identification of the vehicle model to minimize an error between the characteristics of the vehicle model and the characteristics of the simulated actual vehicle by using one or more vehicle motion variables such as the yaw rate and the lateral acceleration sensed by sensors, in the same manner as vehicle motion estimating systems proposed by a Japanese patent application No. 60-143840, and the U.S. patent application Ser. No. 837,170. Furthermore, the present invention is applicable to vehicle steering control systems for estimating a vehicle motion variable by using a vehicle model and controlling either or both of the front and rear wheel steer angles so as to achieve the estimated motion variable, as proposed by the U.S. patent applications Nos. 755,352 and 773,650.

The present invention can make it possible to determine a plurality of the vehicle motion variables without using many sensors, and to determine even the motion variables which are difficult or impossible to sense. Furthermore, the present invention can provide a high speed, high precision system for estimating vehicle motion variables.

What is claimed is:

1. A vehicle motion estimating system mounted on a vehicle for estimating a vehicle motion variable by solving a mathematical model which is a set of equations of vehicle motion, comprising:
    a steering amount sensor for sensing a steering amount of said vehicle;
    a vehicle speed sensor for sensing a vehicle speed of said vehicle;
    a processing unit connected with said steering amount sensor and said vehicle speed sensor for determining a value of said vehicle motion variable by solving said mathematical model by use of said steering amount and said vehicle speed, and producing an output signal representing said vehicle motion variable,
    said processing unit comprising:
    a digital device for solving a first subset of said set, said first subset containing a first equation which is one of a nonlinear equation and a time-varying differential equation, and
    an analog device for solving a second subset of said set, said second subset containing a second equation which is a time-invariant linear differential equation and which is not contained in said first subset; and
    means for controlling said vehicle in response to said output signal of said processing unit.

2. An estimating system according to claim 1 wherein said analog device solves every time-invariant linear differential equation belonging to said set, and said digital device solves the remainder of said set.

3. An estimating system according to claim 2 wherein said time-invariant linear differential equation is a differential equation which can be described by a state equation of a system which is time-invariant and linear.

4. An estimating system according to claim 1 wherein said set comprises an equation of steering system, and said analog device solves said equation of steering system.

5. An estimating system according to claim 4 wherein said set further comprises an equation of side slipping motion and an equation of yawing motion, and said digital device solves said equations of side slipping motion and yawing motion.

6. An estimating system according to claim 5 wherein said set further comprises an equation of rolling motion, and said analog device solves said equation of rolling motion.

7. A vehicle motion estimating system for estimating a vehicle motion variable by solving a mathematical model which is a set of equations of vehicle motion, comprising:
    a steering amount sensor for sensing a steering amount of said vehicle;
    a vehicle speed sensor for sensing a vehicle speed of said vehicle;
    a processing unit connected with said steering amount sensor and said vehicle speed sensor for determining a value of said vehicle motion variable by solving said mathematical model by use of said steering amount and said vehicle speed, and producing an output signal representing said vehicle motion variable,
    said processing unit comprising:
    a digital device for solving a first subset of said set, said first subset containing a first equation which is one of a nonlinear equation and a time-varying differential equation,
    an analog device for solving a second subset of said set, said second subset containing a second equation which is a time-invariant linear differential equation and which is not contained in said first subset; and
    means for controlling said vehicle in response to said output signal of said processing unit; wherein
    said set comprises an equation of steering system, and said analog device solves said equation of the steering system, and said set further comprises an equation of side slipping motion and an equation of yawing motion, and said digital device solves said equations of side slipping motion and yawing motion, and wherein
    said equation of steering system is an equation given by:

$$I_K \ddot{\delta}_F = K_S(\theta_S/N - \delta_F) - D_K \dot{\delta}_F - M_F$$

wherein $M_F$ equals $2(\xi_N + \xi_C)C_F$, $I_K$ is a moment of inertia of a kingpin, $K_S$ is a steering stiffness, $N$ is a steering gear ratio, $D_K$ is a viscosity coefficient about a kingpin, $\delta_F$ is a front wheel steer angle, $\dot{\delta}_F$ is a first derivative of the front wheel steer angle with respect to time, $\ddot{\delta}_F$ is a second derivative of the front wheel steer angle with respect to time, $\theta_S$ is said steering amount, $M_F$ is a self aligning torque, $\xi_N$ is a pneumatic trail, $\xi_C$ is a caster trail, and $C_F$ is a front wheel cornering force.

8. An estimating system according to claim 7 wherein said set further comprises an equation of rolling motion, and said equations of side slipping motion, yawing motion and rolling motion are, respectively, expressed as:

$$M(\dot{V}_y + V\dot{\psi}) = 2C_F + 2C_R$$

$$I_Z \ddot{\psi} = 2L_F C_F - 2L_R C_R$$

$$I_X \ddot{\phi} = -C_\phi \dot{\phi} - K_\phi \phi + (H_g + H_\phi)M\alpha$$

where $$C_F = K_F \beta_F, C_R = K_R \beta_R,$$

$$\beta_F = \delta_F + R_{SF}\phi - (V_y + L_F\dot{\psi})/V,$$

$$\beta_R = R_{SR}\phi - (V_y - L_R\dot{\psi})/V,$$

$$\alpha = \dot{V}_y + V\dot{\psi},$$

and where M is a vehicle mass, $I_Z$ is a yawing moment of inertia, $L_F$ is a distance between a front axle and a vehicle center of gravity, $L_R$ is a distance between a rear axle and the vehicle center of gravity, $K_F$ is front wheel cornering power, $K_R$ is a rear wheel cornering power, $I_X$ is a rolling moment of inertia, $C_\phi$ is a viscosity coefficient of rolling motion, $K$ is a roll stiffness, $R_{SF}$ is a front roll steer coefficient, $R_{SR}$ is a rear roll steer coefficient, $H_g$ is a height of the center of gravity, H is a rol center height, $\psi$ is a yaw rate, $\ddot{\psi}$ is a yaw acceleration, $V_y$ is a side velocity, $\dot{V}_y$ is a side acceleration, $\beta$ is a side slip angle of the center of gravity, $C_R$ is a rear wheel cornering force, $\beta_F$ is a front wheel tire side slip angle, $\beta_R$ is a rear wheel tire side slip angle, $\phi$ is a roll angle, $\dot{\phi}$ is a first derivative of said roll angle with respect to time, and $\ddot{\phi}$ is a second derivative of said roll angle with respect to time.

9. An estimating system according to claim 8 wherein said digital device is connected with said vehicle speed sensor, and arranged to determine said self aligning torque and a lateral acceleration by solving said equations of side slipping motion and yawing motion, said processing unit further comprises an analog to digital converter and a digital to analog converter, and said analog device comprises a first analog computing circuit for receiving as input signals, said steering amount from said steering amount sensor, and said self aligning torque from said digital device through said digital to analog converter, and determining said front wheel steer angle by solving said equation of steering system, and a second computing circuit for receiving, as an input signal, said lateral acceleration from said digital device through said digital to analog converter, and determining said roll angle by solving said equation of rolling motion, and said digital device is connected with said first and second analog computing circuits through said analog to digital converter, and receives said front wheel steer angle and said roll angle through said analog to digital converter.

10. An estimating system according to claim 9 wherein said digital device determines said yaw rate and said side slip angle of the center of gravity in addition to said self aligning torque and said lateral acceleration by solving said equations of side slipping motion and yawing motion by the use of said vehicle speed, said front wheel angle

* * * * *